Figure 1:
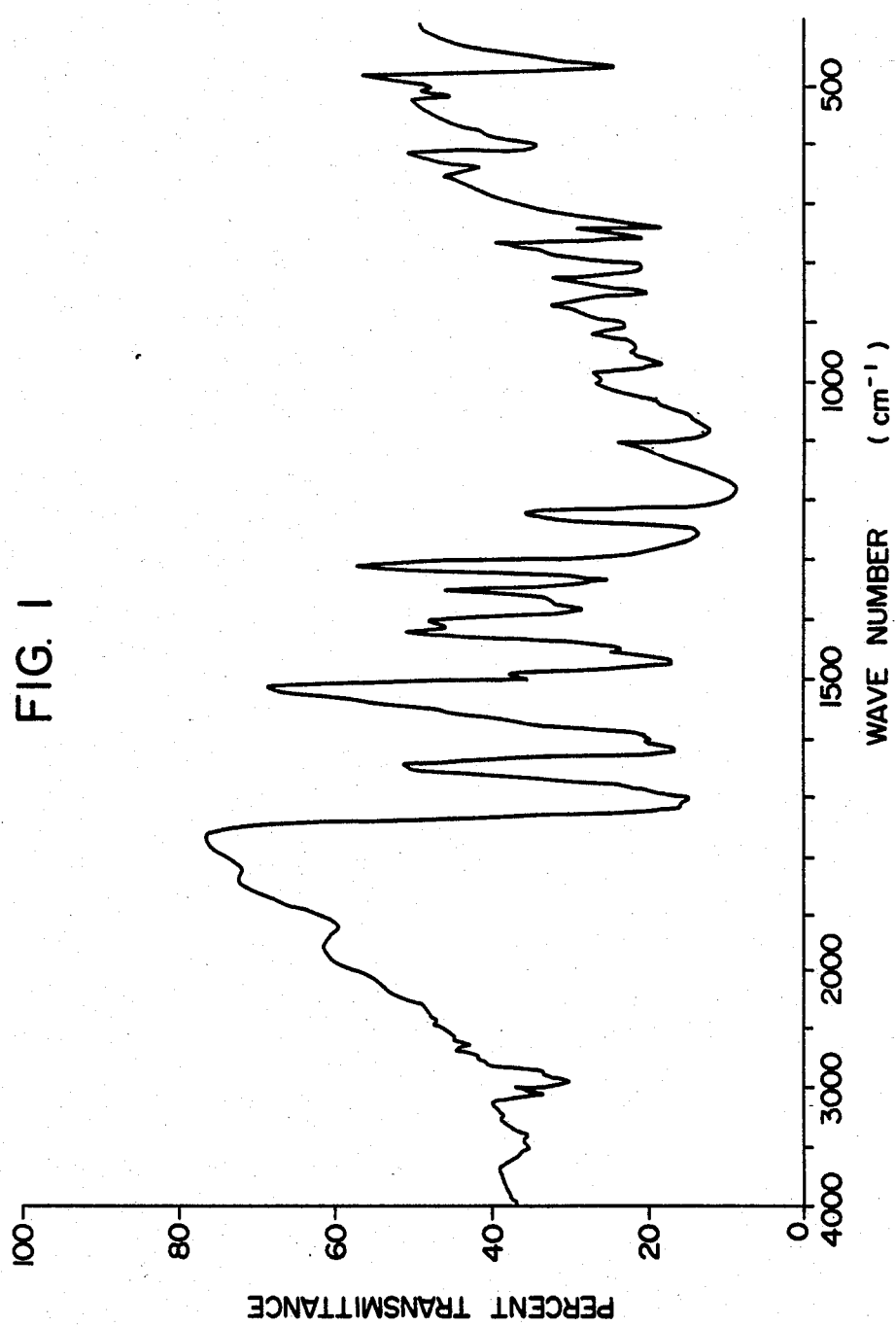

United States Patent [19]

Inata et al.

[11] Patent Number: 4,581,438

[45] Date of Patent: Apr. 8, 1986

[54] AROMATIC POLYESTER OF 6,6'-(ETHYLENEDIOXY)DI-2-NAPHTHOIC ACID, PROCESS FOR PRODUCTION THEREOF AND FILM, FIBER AND OTHER SHAPED ARTICLES THEREFROM

[75] Inventors: Hiroo Inata; Hiroyuki Umetani; Shunichi Matsumura, all of Iwakuni, Japan

[73] Assignee: Teijin Limited, Osaka, Japan

[21] Appl. No.: 682,760

[22] Filed: Dec. 17, 1984

[30] Foreign Application Priority Data

Dec. 23, 1983 [JP] Japan ................................ 58-242098
Apr. 17, 1984 [JP] Japan ................................ 58-75777

[51] Int. Cl.$^4$ .......................................... C08G 63/66
[52] U.S. Cl. .................................... 528/209; 528/176; 528/190; 528/194; 528/195; 528/206; 528/271
[58] Field of Search ............... 528/206, 209, 190, 194, 528/195, 271, 176

[56] References Cited

U.S. PATENT DOCUMENTS

| | | | |
|---|---|---|---|
| 3,185,665 | 5/1965 | Lange .................................. | 528/190 |
| 3,816,368 | 6/1974 | Kobayashi et al. ................. | 528/209 |
| 3,935,166 | 1/1976 | Kanai et al. ......................... | 528/190 |
| 4,395,513 | 7/1983 | Calundann et al. ................. | 528/209 |

*Primary Examiner*—Lester L. Lee
*Attorney, Agent, or Firm*—Wenderoth, Lind & Ponack

[57] ABSTRACT

A novel, substantially linear aromatic polyester comprising 6,6'-(ethylenedioxy)di-2-naphthoic acid as a main acid component and an aliphatic glycol having 2 to 10 carbon atoms in the main chain of the glycol as a main glycol component. The aromatic polyester is prepared by condensing an ethylene glycol diester of 6,6'-(ethylenedioxy)di-2-naphthoic acid, or a mixture of a major proportion of said naphthoate with a dicarboxylic acid, a diol, a hydroxycarboxylic acid or an ester-forming derivative thereof, at an elevated temperature. The aromatic polyester has excellent mechanical properties such as strength and Young's modulus.

15 Claims, 2 Drawing Figures

AROMATIC POLYESTER OF 6,6'-(ETHYLENEDIOXY)DI-2-NAPHTHOIC ACID, PROCESS FOR PRODUCTION THEREOF AND FILM, FIBER AND OTHER SHAPED ARTICLES THEREFROM

This invention relates to a novel aromatic polyester, a process for production thereof, and to a shaped article thereof including a fiber and film. More specifically, this invention relates to a novel aromatic polyester containing a naphthalene skeleton and an ether linkage, a process for production thereof, and to a shaped article thereof including a fiber and film.

Heretofore, aromatic polyesters having diphenoxyethanedicarboxylic acid or 2,6-naphthalenedicarboxylic acid as a main dicarboxylic acid component, or aromatic polyesters having 6-(beta-hydroxyethoxy)-2-naphthoic acid as a main hydroxycarboxylic acid component have been known as aromatic polyesters having a naphthalene skeleton and/or an ether linkage (see "FIBERS FROM SYNTHETIC POLYMERS", Elsevier New York, 1953, Chap. 6, and Japanese Patent Publication No. 4112/1973).

It is an object of this invention to provide a novel aromatic polyester.

Another object of this invention is to provide a novel aromatic polyester which can be melt-shaped.

Another object of this invention is to provide a novel aromatic polyester which shows optical isotropy in the molten state.

Another object of this invention is to provide a novel aromatic polyester having excellent mechanical properties such as strength and Young's modulus.

Another object of this invention is to provide a novel aromatic polyester having excellent chemical properties such as hydrolysis resistance.

Another object of this invention is to provide a novel aromatic polyester having excellent dimensional stability at elevated temperatures.

Another object of this invention is to provide a novel aromatic polyester which dimensionally changes very little with changes in temperature and/or humidity.

Another object of this invention is to provide a process for producing the aforesaid novel aromatic polyester.

Another object of this invention is to provide a shaped article such a fiber or film prepared from the novel aromatic polyester, which has the various excellent properties mentioned above.

Further objects and advantages of this invention will become apparent from the following description.

According to this invention, these objects and advantages are achieved by a substantially linear aromatic polyester comprising 6,6'-(ethylenedioxy)di-2-naphthoic acid as a main acid component and an aliphatic glycol having 2 to 10 carbon atoms in the main chain of the glycol as a main glycol component.

According to this invention, the aromatic polyester can be produced by condensing a dicarboxylic acid component composed mainly of 6,6'-(ethylenedioxy)di-2naphthoic acid or its ester-forming derivative and a glycol component composed mainly of an aliphatic glycol having 2 to 10 carbon atoms in the main chain of the glycol at an elevated temperature.

6,6'-(Ethylenedioxy)di-2-naphthoic acid is a novel compound represented by the following structural formula:

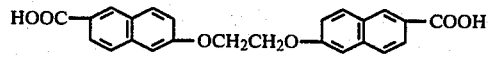

This compound can be easily produced, for example, by reacting 6-hydroxy-2-naphthoic acid with a dihaloethane such as dichloroethane or dibromoethane in the presence of an alkaline compound such as potassium hydroxide and then converting the product into a free acid using a strong acid such as sulfuric acid.

Likewise, the ester-forming derivative of 6,6'-(ethylenedioxy)di-2-naphthoic acid, for example its ester, can be easily produced, for example, by reacting the ester at the carboxyl group of 6-hydroxy-2-naphthoic acid with a dihaloethane in the presence of an alkaline compound such as an alkali metal alcoholate or potassium carbonate.

In the process of this invention, 6,6'-(ethylenedioxy)-di-2-naphthoic acid or its ester-forming derivative is used as the dicarboxylic acid component. As required, a minor proportion of another dicarboxylic acid, a hydroxycarboxylic acid, or an ester-forming derivative thereof may be used in combination.

The other dicarboxylic acid as a minor component may be one represented by the following formula (II)

$$HOOC-R^1-COOH \qquad (II)$$

wherein $R^1$ represents an alkylene group having 2 to 10 carbon atoms, a cycloalkylene group or an arylene group. Specific examples of the dicarboxylic acid of formula (II) are terephthalic acid, isophthalic acid, 2,6-naphthalenedicarboxylic acid, 4,4'-diphenyldicarboxylic acid, adipic acid, azelaic acid, sebacic acid and cyclohexane-1,4-dicarboxylic acid.

The hydroxycarboxylic acid likewise used as a minor component may, for example, be one represented by the following formula (III)

$$HOOC-R^2-OH \qquad (III)$$

wherein $R^2$ represents an alkylene group having 2 to 10 carbon atoms, a cycloalkylene group, an arylene group or a phenylene-oxyalkylene group. Specific examples of the hydroxycarboxylic acid of formula (III) are hydroxybenzoic acid, beta-hydroxyethoxybenzoic acid, hydroxynaphthoic acid, beta-hydroxyethoxynaphthoic acid, hydroxycaproic acid and 4-hydroxycyclohexanecarboxylic acid.

It should be understood that the term "esterforming derivative" as used herein with regard to the carboxylic acid component used in this invention denotes a compound which can react with the aliphatic glycol and consequently forms an ester, for example an ester thereof such as a $C_1$-$C_6$ alkyl ester or phenyl ester thereof, and an acid halide thereof such as an acid chloride thereof.

When the dicarboxylic acid component used is a combination of 6,6'-(ethylenedioxy)di-2-naphthoic acid or its ester-forming derivative with the other dicarboxylic acid, hydroxycarboxylic acid or the ester-forming derivative thereof, the other component is used in an amount of less than 50 mole %, preferably less than 30 mole %, above all less than 20 mole %, based on the total amount of the acid component.

An aliphatic glycol having 2 to 10 carbon atoms in its main chain is used as the glycol component in the process of this invention. As required, it may be used in combination with another diol as a minor glycol component.

The main chain of the glycol will be understood as denoting the shortest chain portion connecting its two hydroxyl groups.

The aliphatic glycol may be linear or branched, or interrupted by an oxygen atom, or contain a carbocyclic ring so long as its main chain has 2 to 10 carbon atoms.

Preferred linear glycols are, for example, those represented by the following formula (I)

$$HO-(CH_2)_n OH \qquad (I)$$

wherein n is a number of 2 to 10.

The branched glycols are, for example, those represented by the following formula (I)'

$$HO \left[ \begin{array}{c} R^3 \\ | \\ C \\ | \\ R^4 \end{array} \right]_m OH \qquad (I)'$$

wherein $R^3$ and $R^4$ are identical or different and each represents a hydrogen atom or a methyl or ethyl group, and m is a number of 2 to 10, provided that two or more $R^3$ groups or two or more $R^4$ groups in the molecule may be identical with each other or different from each other, but at least one $R^3$ or $R^4$ is a methyl or ethyl group.

Examples of the aliphatic glycols include ethylene glycol, 1,2-propylene glycol, trimethylene glycol, tetramethylene glycol, neopentyl glycol, 2-methyl-1,4-butanediol, hexamethylene glycol, octamethylene glycol, decamethylene glycol, cyclohexane-1,4-dimethanol, cyclohexane-1,4-diol and 1,4-bis(beta-hydroxyethoxy)benzene.

The other diol used as the minor glycol component is preferably one represented by the following formula (IV)

$$HO-R^5-OH \qquad (IV)$$

wherein $R^5$ represents an aromatic group. Examples include hydroquinone, resorcinol, 2,6-hydroxynaphthalene, 4,4'-dihydroxydiphenyl, 2,2-bis(4-hydroxyphenyl)propane, bis(4-hydroxyphenyl)sulfone, 1,1-bis(4-hydroxyphenyl)cyclohexane, and bis(4-hydroxyphenyl)ether.

The diol as the minor glycol component may be used in an amount of preferably less than 50 mole %, more preferably less than 30 mole %, above all less than 20 mole %, based on the total amount of the glycol component.

The novel aromatic polyester of this invention can be produced by condensing the dicarboxylic acid component composed mainly of 6,6'-(ethylenedioxy)di-2-naphthoic acid or its ester-forming derivative with the glycol component composed mainly of the aliphatic glycol at an elevated temperature.

The condensation reaction is carried out usually in the presence of a catalyst using 1.1 to 3 moles of the glycol component per mole of the acid component.

Examples of the catalyst include metallic elements such as sodium, potassium, lithium, calcium, magnesium, beryllium, tin, strontium, zinc, iron, germanium, aluminum, cobalt, lead, nickel, titanium, manganese and antimony, and the oxides, hydrides, hydroxides, halides, inorganic or organic acid salts, complex salts, double salts, alcoholates and phenolates of these metallic elements. They may also be used in combination with each other. Antimony compounds, germanium compounds and titanium compounds are preferred as the condensation catalyst. The preferred amount of the catalyst is in the range of about 0.005 to 0.5 mole % based on the acid component. The preferred condensation temperature is between the melting point of the polymer obtained and 350° C., particularly between the melting point plus 5° C. and 330° C.

In the condensation reaction, a compound having one ester-forming functional group such as benzoic acid or benzoylbenzoic acid, a compound having at least three ester-forming functional groups such as glycerol, pentaerythritol, trimellitic acid and pyromellitic acid, or an ester-forming derivative thereof may be used jointly and copolymerized so long as the resulting aromatic polyester remains substantially linear. The compound having at least three ester-forming functional group can be used, for example in an amount of not more than 0.2 mole % based on the entire acid component.

The aromatic polyester of this invention may be produced by an alternative process which comprises condensing an ethylene glycol diester of 6,6'-(ethylenedioxy)di-2-naphthoic acid, i.e. bis(beta-hydroxyethyl) 6,6'-(ethylenedioxy)di-2-naphthoate at an elevated temperature, or a mixture of a major proportion of the aforesaid naphthoate with a dicarboxylic acid, a diol, a hydroxycarboxylic acid, or an ester-forming derivative thereof, at an elevated temperature.

bis(beta-Hydroxyethyl) 6,6'-(ethylenedioxy)di-2-naphthoate is produced, for example, by reacting an ethylene glycol ester of 6-oxy-2-naphthoic acid with a dihaloethane in an ethylene glycol solvent in the presence of an alkaline compound such as an alkali metal alcoholate or potassium carbonate.

Condensation of bis(beta-hydroxyethyl) 6,6'-(ethylenedioxy)di-2-naphthoate alone gives aromatic homopolyester of this invention with generation of ethylene glycol. Condensation of a mixture of this naphthoate with the dicarboxylic acid [excluding 6,6'-(ethylenedioxy)di-2-naphthoic acid], the diol (excluding ethylene glycol), the hydroxycarboxylic acid or the ester-forming derivative thereof gives the aromatic copolyester of this invention.

In this mixture, the naphthoate accounts for a major portion, namely at least 50 mole %, preferably at least 70 mole %, above all at least 80 mole %, of the total amount of it and the dicarboxylic acid, the diol, the hydroxycarboxylic acid or the ester-forming derivative thereof.

Condenstion of a mixture of this naphthoate with 6,6'-(ethylenedioxy)di-2-naphthoic acid or its ester-forming derivative, of course, gives the homopolyester of this invention.

The condensation catalyst, the condensation temperature, etc. or the dicarboxylic acid, diol, hydroxycarboxylic acid, the ester-forming derivative thereof, etc. which are used in the alternative process may be the same as those used in the process described hereinabove.

According to this invention, solid-phase polymerization may be used in combination with the aforesaid melt polymerization method. The solid-phase polymerization technique is advantageous especially when it is desired to produce an aromatic polyester having a high degree of polymerization, for example one having an inherent viscosity of at least 0.6. It is carried out by pulverizing the polymer of a relatively low degree of polymerization obtained by the melt polymerization method, and heating it to at a temperature lower than the melting point of the polymer under reduced pressure and/or in a stream of an inert gas.

Thus, according to this invention, there is provided a substantially linear aromatic polyester comprising 6,6'-(ethylenedioxy)di-2-naphthoic acid as a main acid component and an aliphatic glycol having 2 to 10 carbon atoms in the main glycol chain as a main glycol component.

When the linear glycol of formula (I) is used as the main glycol component, the aromatic polyester of this invention is a homopolyester or copolyester composed mainly of recurring units of the following formula

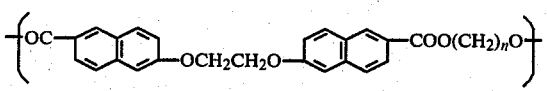

wherein n is a number of 2 to 10.

When the branched chain glycol of formula (I)' is used as the main glycol component or the other dicarboxylic acid, the hydroxycarboxylic acid or the other diol is used as a minor component, those skilled in the art will easily recognize the recurring units of the resulting aromatic polyester by referring to the recurring units given by the above formula.

The aromatic polyester of this invention has a high melting point but can be melt-shaped. It is optically isotropic in the molten state. Aromatic polyesters obtained by this invention using a glycol in which the shortest chain portion connecting the two hydroxyl groups is composed of an even number of carbon atoms bonded to each other, for example ethylene glycol, 1,2-propylene glycol, tetramethylene glycol, hexamethylene glycol, cyclohexane-1,4-dimethanol, octamethylene glycol or decamethylene glycol, as the aliphatic glycol give shaped articles having a high Young's modulus and excellent dimensional stability and various other excellent properties which make them useful in various industrial fields. Aromatic polyesters in accordance with this invention having an inherent viscosity of at least 0.4 are particularly superior as various industrial materials.

For example, polyethylene 6,6'-(ethylenedioxy)di-2-naphthalate shows a crystalline melting point of 294° C. This melting point is about 30° C. higher than the melting point of polyethylene 2,6-naphthalate which is 267° C. The relation of the melting points of these polymers shows quite a contrary tendency to the relation of the melting points of polyethylene terephthalate (255° C.) and polyethylene 4,4'-(ethylene dioxy)dibenzoate (234° C.) which corresponds to a polymer resulting from the substitution of a p-phenylene group for the 2,6-naphthalene group of polyethylene 2,6-naphthalate. This is presumably because of the uniqueness of the naphthalene ring.

The aromatic polyesters of this invention can be shaped by using melt-shaping techniques such as extrusion, injection molding, compression molding and blow molding, and can be formed into fibers, films and three-dimensional shaped articles such as containers and hoses.

For example, fibers can be produced as follows from the aromatic polyester of this invention. The aromatic polyester is dried, melted at a temperature higher than the crystalline melting point (Tm, °C.) of the polymer but lower than 350° C., preferably lower than 330° C., more preferably lower than 320° C., and extruded from a spinning nozzle to form an undrawn fibrous material having a diameter of, for example, not more than 3 mm. The undrawn fibrous material is then drawn and heat-treated. The drawing is preferably carried out first at a temperature of (Tg−10)° C. to (Tg+30)° C. in which Tg is the glass transition temperature (°C.) of the polyester (first-stage drawing). Preferably, it is further drawn or heat-treated at a temperature ranging from the first-stage drawing temperature to (Tm−10)° C. The draw ratio is usually about 3 to 10 in total.

A film may be formed from the aromatic polyester of this invention as follows: The aromatic polyester is dried, melted at a temperature higher than the melting point (Tm) of the polymer but lower than 350° C., preferably lower than 330° C., extruded from a film-forming die, and subsequently contacted with the surface of a rotating drum kept at a temperature lower than the glass transition temperature (Tg) of the polymer to quench it. The resulting unstretched film so obtained has excellent heat resistance and hydrolysis resistance. To improve these properties further, the unstretched film may be stretched monoaxially or biaxially. Preferably, the stretching is carried out at a temperature in the range of (Tg−10)° C. to (Tg+50)° C. at an area stretch ratio of at least 2, preferably at least 5, especially at least 8. Biaxial stretching may be carried out successively or simultaneously. The stretched film is preferably stretched further or heat-treated at a temperature ranging from the stretching temperature to (Tm−10)° C.

Investigations of the present inventors have shown that when the aromatic polyester of this invention is treated at an elevated temperature in an atmosphere containing molecular oxygen such as oxygen or air, crosslinking takes place between the molecular chains and a shaped article having better mechanical properties, heat resistance, chemical resistance or dimensional stability can be obtained. Such a crosslinking treatment is carried out preferably at the treating temperature (T₁) for the treating time (t) which simultaneously satisfy the following expressions.

$$\text{Int} \geq 16.9 \times 10^3 \frac{1}{T_1 + 273.2} - 27.5$$

and $$200 \leq T_1 < Tm$$

wherein Tm is the crystalline melting point (°C.) of the polymer, $T_1$ is the treating temperature (°C.), and t is the treating time (minutes), preferably under the conditions which simultaneously satisfy the following expressions $$\text{Int} \geq 16.9 \times 10^3 \times \frac{1}{T_1 + 273.2} - 26.8$$

and $$200 \leq T_1 < Tm.$$

Especially preferably, it is carried out under conditions which simultaneously satisfy the following expressions.

$$\text{Int} \geq 16.9 \times 10^3 \times \frac{1}{T_1 + 273.2} - 26.5$$

and $$230 \leq T_1 < Tm.$$

The shaped article subjected to the crosslinking treatment under the above conditions is crosslinked such that when it is at least partially melted by heating at 320° C. for several seconds and then quenched in dry icemethanol, it does not completely dissolve in a mixed solvent of p-chlorophenol and tetrachloroethane in a mixing weight ratio of 40:60 heated at 150° C., but leaves a nondissolved portion. Furthermore, the crosslinked molded article does not melt at a temperature of 400° C. or below. Investigations of the present inventors have also shown that the aromatic polyester of this invention is improved in heat resistance or dimensional stability when it is heat-treated for a short period of time stepwise or continuously under specified temperature conditions. While the aforesaid crosslinking treatment improves the properties of the shaped article by crosslinkage between the polymer chains, it is believed that this heat-treatment causes the melting point of the polymer of the shaped article to approach gradually the final crystalline melting point of the polymer, and as a result, improves the properties of the shaped article.

This heat-treatment is preferably carried out at the temperature $T_2$ (° C.) which satisfies the following expression $$Ts \leq T_2 < TmR$$

wherein Ts (°C.) and TmR (°C.) represent the rising temperature and peak temperature respectively of a melting point peak measured by a differential scanning calorimeter (DSC) on a product obtained by subjecting a shaped article to be heat-treated at the temperature $T_2$ (°C.) to crosslinking treatment in air at 230° C. for 50 hours. The heat-treatment at the temperature $T_2$ may be carried out at constant length, under tension or under restricted shrinkage. The atmosphere in which the treatment is carried out may be a gas such as air, nitrogen or argon or a liquid such as a silicone oil. The treating time may, for example, be 0.1 second to 60 minutes, usually 1 second to 45 minutes, more strictly 5 seconds to 30 minutes.

For example, a film obtained by forming a homopolyester having 6,6'-(ethylenedioxy)di-2-naphthoic acid as an acid component and ethylene glycol as a glycol component into a film in the manner described above and biaxially stretching the resulting unstretched film has a Ts of 250° C. and a TmR of 265° C. Hence, this film should be heat-treated at $T_2$ (°C.) in the range of $250 \leq T_2 < 265$.

This film was heat-treated at 260° C. for 5 minutes. A part of the heat-treated film was subjected to the same crosslinking treatment as above in air at 230° C. for 60 hours, and its Ts and TmR were measured by DSC. Ts rose to 263° C., and TmR rose to 283° C. Accordingly, when this film is to be again heat-treated, the heat-treatment should be carried out at the temperature $T_2$ (°C.) in the range of $263 \leq T_2 < 83$.

By heat-treating the shaped article of the aromatic polyester of this invention at the temperature $T_2$ (°C.) either stepwise as shown above, or continuously, the melting point of the polymer of the shaped article can be raised to the final crystalline melting point (294° C. in the case of the above homopolyester) within a short period of time without any process trouble.

As required, other thermoplastic polymers, stabilizers such as ultraviolet absorbers, antioxidants, plasticizers, lubricants, fire retardants, mold releasing agents, pigments, nucleating agents, fillers, or reinforcing materials such as glass fibers, carbon fibers and asbestos may be incorporated into the aromatic polyester of this invention.

The following examples illustrate the present invention.

The inherent viscosity values given in these examples were measured at 35° C. using a mixture of p-chlorophenol and tetrachloroethane (40:60 by weight). The glass transition point (Tg) and the melting points (Ts, TmR and Tm) of the polymer were measured by DSC at a temperature raising rate of 20° C./min. All parts in these examples are by weight.

The temperature dependent expansion and humidity dependent expansion were measured by the following methods.

(1) Temperature dependent expansion

The temperature dependent expansion is measured by placing a thermomechanical analyzer TM-3000 manufactured by Shinku Riko K.K. A film sample 15 mm long and 5 mm wide which has been previously heat-treated at 70° C. for 30 minutes and then cooled is put in the analyzer. The maximum and minimum values of the temperature dependent expansion are measured by reading a dimensional change between a temperature of 10° C. and a relative humidity of 0% on one hand and a temperature of 40° C. and a relative humidity of 0% on the other in each of directions spaced apart with an angle of 15° along the surface of the film sample. A load used in measuring the expansion is 3.75 kg per square centimeter of the sectional area of the film sample.

(2) Humidity dependent expansion

A film sample previously treated at a temperature of 40° C. and a relative humidity of 90% is placed in the same analyzer as used in (1) above. The maximum and minimum values of the humidity dependent expansion are measured by reading a dimensional change between a temperature of 20° C. and a relative humidity of 30% on one hand and a temperature of 20° C. and a relative humidity of 70% on the other in each of directions spaced apart with an angle of 15° along the surface of the film sample. The size of the film sample and the load used in measuring the humidity dependent expansion are the same as in measuring the temperature dependent expansion described above.

EXAMPLE 1

A reactor equipped with a rectifying column was charged with 458 parts of diethyl 6,6'-(ethylenedioxy)-di-2-naphthoate (melting point 193° C.), 130 parts of ethylene glycol and 0.1 part of titanium tetrabutoxide, and these materials were heated at 200° to 260° C. Ethanol generated by the reaction was distilled out of the reactor. When ethanol distilled in an amount nearly corresponding to the theoretical amount, the reaction product was transferred to a reactor equipped with a stirrer, a nitrogen gas introducing inlet and a distillation outlet, and reacted at 290° C. under atmospheric pressure for 30 minutes in a stream of nitrogen gas. Then, the reaction temperature was raised to 310° C., and the pressure of the inside of the reactor was gradually reduced to an absolute pressure of about 0.2 mmHg over 15 minutes. At this temperature and pressure, the reaction was further carried out for 10 minutes. The resulting polymer was transparent in the molten state, and crystallized when quenched. It had an inherent viscosity of 0.63, a glass transition point of 129° C., and a melting point of 294° C.

FIG. 1 shows the infrared absorption spectrum (by the KBr method) of the resulting polymer.

The diethyl 6,6'-(ethylenedioxy)di-2-naphthoate used in the above procedure was producd by the following method.

A reactor equipped with a stirrer and a reflux condenser was charged with 216 parts of ethyl 6-hydroxy-2-naphthoate, 23 parts of sodium, 94 parts of dibromoethane and 2000 parts of ethanol, and they were reacted under the refluxing of ethanol for 10 hours. The reaction product was cooled, filtered and recrystallized from dioxane to give 97 parts of white crystals having a melting point of 194 ° C.

The elemental analysis values of this product were as follows:

|  | Calculated (%) | Found (%) |
| --- | --- | --- |
| Carbon | 73.35 | 73.5 |
| Hydrogen | 5.72 | 5.6 |

EXAMPLE 2

A reactor equipped with a rectifying column was charged with 458 parts of diethyl 6,6'-(ethylenedioxy)-di2-naphthoate, 225 parts of tetramethylene glycol and 0.1 part of titanium tetrabutoxide, and they were heated to 200° to 240° C. Ethanol generated by the reaction was distilled out of the reactor. When about 80 parts of the distillate was obtained, the reaction product was transferred to a reactor equipped with a stirrer, a nitrogen gas introducing inlet and a distillation outlet, and reacted at 270° C. under atmospheric pressure for 30 minutes in a stream of nitrogen. Then, the pressure of the inside of the reactor was gradually reduced to an absolute pressure of about 0.2 mmHg over 15 minutes. The reaction was further carried out under this pressure for 15 minutes. The resulting polymer had an inherent viscosity of 0.76, a glass transition point of 95° C. and a melting point of 262° C.

Figure 2:
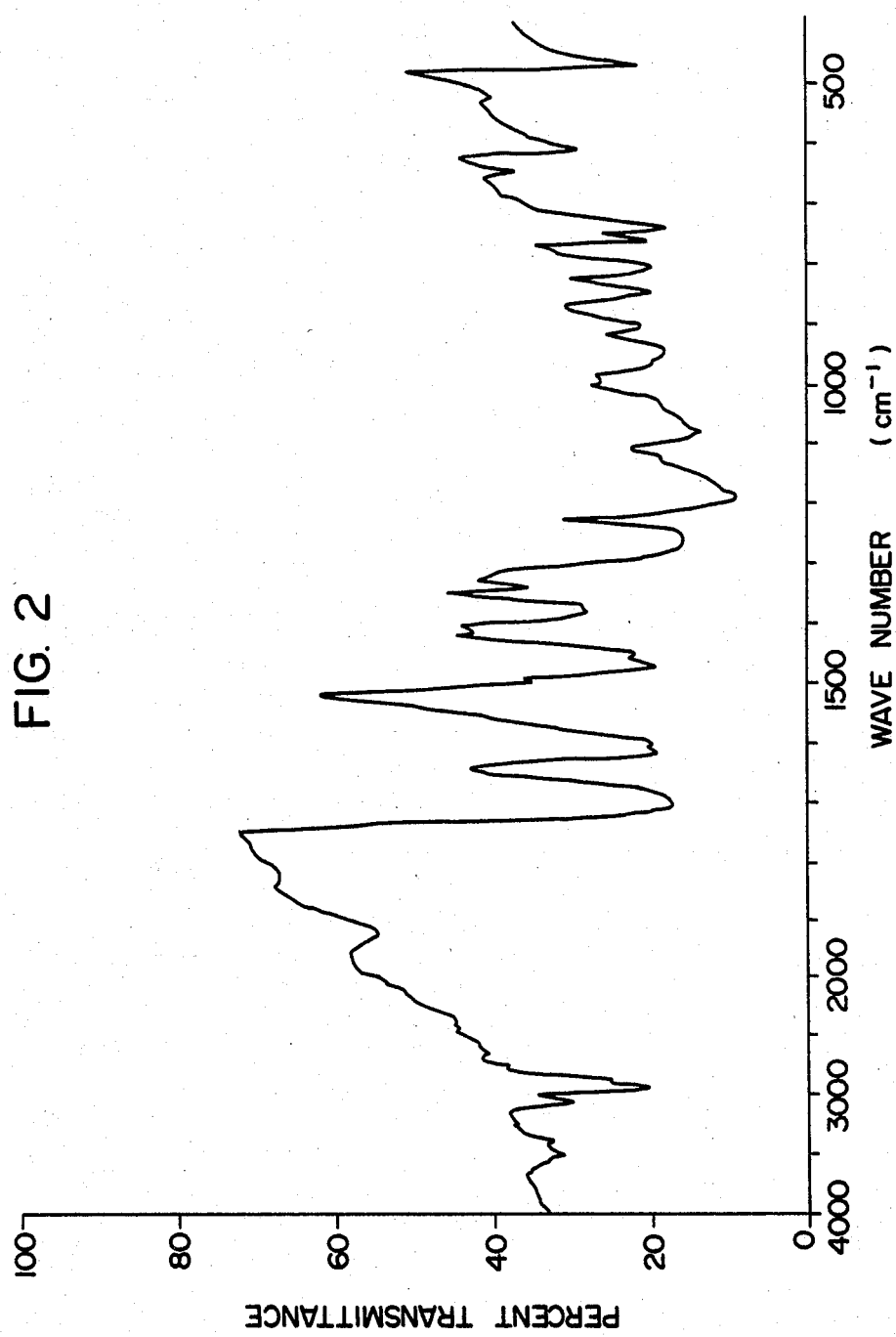

The infrared absorption spectrum (by the KBr method) of the polymer is shown in FIG. 2.

EXAMPLE 3

The polymer obtained in Example 1 was pulverized, dried, melted at 320° C., extruded from a spinning nozzle having a diameter of 0.5 mm and a length of 5 mm, and wound up at a draft of about 10. The undrawn filament was stretched to 5.0 times on a hot plate at 140° C., and further to 1.3 times on a hot plate at 190° C. The drawn filament had a diameter of 17 denier, a tenacity of 7.6 g/de, an elongation of 8% and a Young's modulus of 3,410 kg/mm$^2$.

EXAMPLE 4

A reactor equipped with a rectifying column was charged with 41.2 parts of diethyl 6,6'-(ethylenedioxy)-di2-naphthoate, 1.9 parts of dimethyl isophthalate, 13 parts of ethylene glycol, 0.02 part of calcium acetate and 0.01 part of antimony trioxide, and they were heated to 180° to 260° C. Ethanol and methanol generated by the reaction were distilled out of the reactor. When they distilled out in nearly theoretical amounts, the reaction product was transferred to a reactor equipped with a stirrer, a nitrogen gas introducing inlet and a distillation outlet, and reacted at 290° C. under atmospheric pressure for 30 minutes in a stream of nitrogen gas. Then, the reaction temperature was raised to 310° C., and the pressure of the inside of the reactor was gradually reduced to an absolute pressure of about 0.2 mmHg over 15 minutes. The reaction was further carried out at this temperature and pressure for 50 minutes. The resulting polymer was crystalline, and had an inherent viscosity of 0.65, a glass transition point of 124° C. and a melting point of 282° C.

EXAMPLE 5

The polymer obtained in Example 4 was melt-spun in the same way as in Example 3. The undrawn filament was drawn to 6.0 times on a hot plate at 130° C., and further to 1.1 times at 180° C. on a hot plate. The drawn filament had a diameter of 16 denier, a tenacity of 7.9 g/de, an elongation of 8% and a Young's modulus of 3,170 kg/mm$^2$.

EXAMPLES 6–9

The polymer obtained in Example 1 was pulverized, dried, melted at 320° C., extruded from a T-die having a lip clearance of 0.5 mm, and brought into intimate contact with the surface of a rotating drum kept at about 80° C. to quench it. The unstretched film was opalescent and had the properties shown in Table 1 for Example 6.

The unstretched film was then stretched in one direction at 140° C. and further at 150° C. in a direction right angles to the first stretching direction at each of the stretch ratios shown in Table 1 to obtain a biaxially stretched film. The properties of the stretched film are shown in Table 1 for Examples 7 to 9.

TABLE 1

| Example | Stretch ratio in the first stretching | Stretch ratio in the second stretching | Strength (kg/mm$^2$) | | Young's modulus (kg/mm$^2$) | | Elongation (%) | | Appearance |
| --- | --- | --- | --- | --- | --- | --- | --- | --- | --- |
| | | | First stretching direction | Second stretching direction | First stretching direction | Second stretching direction | First stretching direction | Second stretching direction | |
| 6 | — | — | 7.8* | | 275* | | 125* | | Opalescent |
| 7 | 2.7 | 4.1 | 20.1 | 23.0 | 485 | 1110 | 13 | 7 | Transparent |
| 8 | 2.8 | 5.0 | 19.8 | 38.7 | 516 | 1340 | 26 | 5 | " |
| 9 | 3.0 | 5.0 | 18.7 | 47.9 | 560 | 1450 | 12 | 5 | " |

*Properties in the film-forming direction

EXAMPLE 10 AND COMPARATIVE EXAMPLE 1

One gram of the film obtained in Example 6 was immersed for 10 hours in a 20% aqueous solution of sodium hydroxide heated at 80° C. During this time, the film did not at all decompose nor was there a decrease in weight.

For comparison, an unstretched film of polyethylene terephthalate was treated in the same way as above. It gradually decomposed from the surface, and after the lapse of 10 hours, its weight retention was 39% (weight decrease 61%).

The result shows that the polyester of this invention has excellent hydrolysis resistance.

EXAMPLE 11

The stretched film obtained in Example 9 was heat-treated at constant length in an air atmosphere at 260° C. for 3 minutes and then at 280° C. for 3 minutes. The properties of the heat-treated film in the second stretching direction were as follows:

Strength: 39.7 kg/mm$^2$
Young's modulus: 1,370 kg/mm$^2$
Elongation: 5%

The heat-treated film was immersed in a free state in a silicone oil having each of the temperatures shown in Table 2 for 30 seconds. The shrinkage of the film determined upon termination of the immersion was shown in Table 2

TABLE 2

| Temperature (°C.) | Shrinkage (%) |
|---|---|
| 230 | 0.4 |
| 250 | 0.6 |
| 270 | 1.4 |

EXAMPLE 12

A reactor equipped with a rectifying column was charged with 458 parts of diethyl 6,6'-(ethylenedioxy)-di-2-naphthoate (melting point 193° C.), 288 parts of 1,4-cyclohexane dimethanol [trans/cis(=7/3) mixture] and 0.1 part of titanium tetrabutoxide, and they were heated to 200 to 260° C. Ethanol generated by the reaction was distilled out of the reactor. When ethanol distilled in a nearly theoretical amount, the reaction product was transferred to a reactor equipped with a stirrer, a nitrogen gas introducing inlet and a distillation outlet, and reacted at 290° C. under atmospheric pressure in a stream of nitrogen for 30 minutes. Then, the reaction temperature was raised to 300° C., and the pressure of the inside of the reactor was gradually reduced to an absolute pressure of about 0.2 mmHg over 15 minutes. At this temperature and pressure, the reaction was further carried out for 10 minutes. The resulting polymer was transparent in the molten state, and had an inherent viscosity of 0.75 and a melting point by DSC of 285° C.

EXAMPLE 13

The polymer obtained in Example 12 was pulverized, dried, melted at 300° C., extruded through a spinning nozzle having a diameter of 0.5 mm and a length of 5 mm, and wound up at a draft of about 15. Then, the resulting undrawn filament was drawn to 4.0 times on a hot plate at 150° C., and then to 4.0 times on a hot plate at 150° C. The drawn filament had a diameter of 20 denier, a tenacity of 4.8 g/de, an elongation of 8% and a Young's modulus of 1208 kg/mm$^2$.

EXAMPLE 14

A reactor equipped with a rectifying column was charged with 41.2 parts of diethyl 6,6'-(ethylenedioxy)-di-2-naphthoate, 1.9 parts of dimethyl terephthalate, 29 parts of 1,4-cyclohexane dimethanol [trans/cis(=7/3) mixture], and 0.01 part of titanium tetrabutoxide, and they were heated to 180° to 260° C. Ethanol and methanol generated by the reaction were distilled out of the reactor. When ethanol and methanol distilled out in nearly theoretical amounts, the reaction product was transferred to a reactor equipped with a stirrer, a nitrogen gas introducing inlet and a distillation outlet, and reacted at 290° C. under atmospheric pressure in a stream of nitrogen gas for 30 minutes. Then, the reaction temperature was raised to 300° C., and the pressure of the inside of the reactor was gradually reduced to an absolute pressure of about 0.2 mmHg over 15 minutes. At this temperature and pressure, the reaction was further carried out for 50 minutes. The resulting polymer was crystalline, and had an inherent viscosity of 0.68 and a melting point of 270° C.

EXAMPLE 15

The polymer obtained in Example 14 was pulverized, dried, melted at 295° C., extruded through a T-die having a width of 150 mm and a lip clearance of 0.8 mm, and quenched on a rotating drum kept at 70° C. The resulting unstretched film was stretched simultaneously in the longitudinal and transverse directions at 140° C. at a stretch ratio of 3.5 in each direction. The stretched film had a strength of 20 kg/mm$^2$, an elongation of 24% and a Young's modulus of 380 kg/mm$^2$.

EXAMPLE 16

The unstretched film obtained in Example 6 was biaxially stretched simultaneously at 150° C. at a stretch ratio of 3.5 in each direction. The biaxially stretched film was then treated at constant length in air at 230° C. for 50 hours (to be referred to as the crosslinking treatment). The treated film was insoluble in a mixture of p-chlorophenol and tetrachloroethane (40:60 by weight). It did not melt even when left to stand for 5 minutes on an iron plate heated at 400° C. By DSC, the crosslinked film was found to have a Ts of 250° C. and a TmR of 265° C.

The above non-crosslinked biaxially stretched film was heat-treated at constant length in air at 260° C. (the temperature between Ts and TmR) for 5 minutes. The resulting film was subjected to the same crosslinking treatment as above. The treated film had a Ts of 263° C. and a TmR of 283° C. This shows that the melting point of the polymer of the film increased by the above heat-treatment in air at 260° C. for 5 minutes.

EXAMPLE 17

The biaxially stretched heat-treated film obtained in Example 16 (Ts: 263° C.; TmR: 283° C.) was further heat-treated at constant length in air at 275° C. for 5 minutes, and then subjected to the same crosslinking treatment as in Example 16. The treated film had a Ts of 280° C. and a TmR of 290° C., showing a further increase in melting point.

EXAMPLE 18

The biaxially stretched film obtained in Example 16 (before the heat-treatment) was heated at constant length in air from 250° C. to 280° C. at a temperature raising rate of 5° C./min, and further heat-treated at this temperature for 5 minutes. The resulting film had a Ts of 280° C. and a TmR of 291° C.

EXAMPLE 19

The unstretched film obtained in Example 16 was stretched to 2.5 times at 130° C. in the transverse direction and then to 5 times at 160° C. in the machine direction to obtain a biaxially stretched film. The biaxially stretched film was subjected to the same crosslinking treatment as in Example 16. The crosslinked film was found to have a Ts of 253° C. and a TmR of 267° C. by DSC. The biaxially stretched film was heat-treated in air at constant length by heating it at 255° C. for 1 minute, then at 265° C. for 1 minute and further at 275° C. for 5 minutes. The heat-treated film had a Ts of 280° C. and a TmR of 292° C.

EXAMPLE 20

The biaxially stretched film (before the heat-treatment) obtained in Example 19 was heat-treated at constant length for 5 seconds in a silicone oil at 255° C. The film was subjected to the same crosslinking treatment as in Example 16. The crosslinked film was found to have a Ts of 263° C. and a TmR of 283° C. by DSC. The film was further immersed in a silicone oil at 275° C., and heat-treated at constant length for 30 seconds. The heat-treated film had a Ts of 280° C. and a TmR of 290° C., showing an increase in melting point.

EXAMPLES 21-23

The unstretchd film obtained in Example 6 was heat-treated in a nitrogen atmosphere containing molecular oxygen at a temperature of 220°, 240° and 260° C., respectively, for a period of 44, 12 and 4 hours, respectively. The three films so treated assumed a brown color. Even when they were left to stand for 5 minutes on an iron plate heated at 400° C., they did not melt.

These films were each heated at 320° C. for 5 seconds and then quenched in dry ice-methanol, and thereafter left to stand for 30 minutes in a mixture of p-chlorophenol and tetrachloroethane (40:60 by weight) heated at 150° C. All of these films were found to contain at least 80% by weight of an insoluble portion and were cross-linked.

EXAMPLES 24-26

The non-crosslinked unstretched film obtained in Example 21 was stretched at 150° C. simultaneously in the longitudinal and transverse directions at a stretch ratio of 3.0 in each direction. The biaxially stretched film was heat-treated at constant length in an air atmosphere at 220°, 240° and 260° C. respectively for a period of 45, 12 and 4 hours, respectively. All of the treated films assumed a brownish color. They did not melt even when left to stand for 5 minutes on an iron plate heated at 400° C. The films were heated at 320° C. for 5 seconds and then quenched in dry ice-methanol, and thereafter left to stand for 30 minutes in a mixture of p-chlorophenol and tetrachlororoethane (40:60 by weight) heated at 150° C. All of these films contained at least 80% by weight of an insoluble portion and were crosslinked.

EXAMPLE 27

The polymer obtained in Example 1 was pulverized, dried, melted at 320° C., extruded from a T-die having a lip clearance of 0.5 mm, and brought into intimate contact with a rotating drum kept at about 80° C. to quench the extrudate.

The resulting unstretched film was stretched at 140° C. to 3.4 times in the longitudinal direction and to 3.7 times in the transverse direction, and subsequently heat-treated at 260° C. for 30 seconds to obtain a biaxially stretched film having a thickness of 65 $\mu$m. The resulting biaxially stretched film had the following properties.

Maximum temperature expansion in the planar direction: $19 \times 10^{-6}/°$ C.

Difference between the maximum and minimum values of the temperature dependent expansion: $2.5 \times 10^{-6}/°$ C.

Maximum humidity dependent expansion in the planar direction: $6.0 \times 10^{-6}/\%$ RH Difference between the maximum and minimum values of the humidity dependent expansion: $1.5 \times 10^{-6}/\%$ RH A magnetic coating solution of the following formulation was coated on the biaxially stretched film to a thickness of 5 $\mu$m. The coated film was then calendered and punched out into a disc having an outside diameter of 20 cm and an inside diameter of 3.8 cm. The resulting magnetic recording flexible disc showed little tracking errors with temperature and humidity changes.

Formulation of the magnetic coating solution:

$\gamma$-Fe$_2$O$_3$: 200 parts
Vinyl chloride/vinyl acetate copolymer (VAGH produced by Union Carbide Corporation); 30 parts
Polyurethane (PP-88, a product of Nippon Polyurethane Kogyo K.K.): 20 parts
Isocyanate compound (Coronate HL, a product of Nippon Polyurethane Kogyo K.K.): 40 parts
Carbon (average particle diameter 0.5 $\mu$m). 20 parts
Dimethylsiloxane. 2 parts
Toluene: 70 parts
Methyl ethyl ketone: 70 parts
Cyclohexanone: 70 parts The above ingredients were thoroughly mixed with stirring, and the resulting coating solution was used in the above coating process.

EXAMPLE 28

The polymer obtained in Example 12 was pulverized, dried, melted at 320° C., extruded from a T-die having a lip clearance of 0.5 mm, and brought into intimate contact with a rotating drum kept at about 80° C. to quench the extrudate.

The resulting unstretched film was stretched at 140° C. to 3.0 times in the longitudinal direction and at 145° C. 3.2 times in the transverse direction, and subsequently heat-treated at 240° C. for 30 seconds to obtain a biaxially stretched film having a thickness of 75 $\mu$m. The resulting biaxially stretched film had the following properties.

Maximum temperature expansion in the planar direction: $22 \times 10^{-6}/°$ C.

Difference between the maximum and minimum values of the temperature dependent expansion: $3.0 \times 10^{-6}/°$ C.

Maximum humidity dependent expansion in the planar direction: $5.0 \times 10^{-6}/°$ C.

Difference between the maximum and minimum values of the humidity dependent expansion: $1.0 \times 10^{-6}/\%$ RH The same magnetic coating solution as used in Example 27 was coated on the biaxially stretched film to a thickness of 5, $\mu$m. The coated film was then calendered and punched out into a disk having an outside diameter

15 of 20 cm and an inside diameter of 3.8 cm. The resulting magnetic recording flexible disc showed little tracking errors with temperature and humidity changes.

EXAMPLE 29

A reactor equipped with a rectifying column was charged with 458 parts of diethyl 6,6'-(ethylenedioxy)-di-2-naphthoate, 165 parts of trimethylene glycol and 0.1 part of titanium tetrabutoxide, and they were heated to 200° to 260° C. Ethanol generated by the reaction was distilled out of the reactor. When ethanol distilled in an amount nearly corresponding to the theoretical amount, the reaction product was transferred to a reactor equipped with a stirrer, a nitrogen gas introducing inlet and a distillation outlet, and reacted at 290° C. for 15 minutes under atmospheric pressure in a stream of nitrogen gas. Then, the pressure of the inside of the reactor was gradually reduced to an absolute pressure of about 0.3 mmHg over 15 minutes. The reaction was further continued under these conditions for 45 minutes. The resulting polymer had an inherent viscosity of 0.59, a glass transition temperature of 103° C. and a melting point of 242° C.

EXAMPLE 30

A reactor equipped with a stirrer, a nitrogen gas introducing inlet and a distillation outlet was charged with 490 parts of di-beta-hydroxyethyl 6,6'-(ethylenedioxy)di-2-naphthoate (melting point 239° C.) and 0.15 part of antimony oxide. The ester was reacted at 290° C. under atmospheric pressure in a nitrogen gas stream for 30 minutes. Then, the reaction temperature was raised to 310° C., and the pressure of the inside of the reactor was gradually reduced to an absolute pressure of about 0.2 mmHg over 15 minutes. The reaction was further carried out under these conditions for 10 minutes. The resulting polymer had an inherent viscosity of 0.87, a glass transition temperature of 129° C. and a melting point of 296° C.

EXAMPLE 31

A reactor equipped with a rectifying column was charged with 458 parts of dimethyl 6,6'-(ethylenedioxy)di-2-naphthoate, 130 parts of ethylene glycol, 25 parts of 4,4'-bishydroxydiphenylsulfone, 0.1 part of calcium acetate and 0.15 part of antimony oxide. They were heated to 200 to 260° C., and methanol generated by the reaction was distilled out of the reactor. When methanol distilled in an amount nearly corresponding to the theoretical amount, the reaction product was transferred to a reactor equipped with a stirrer, a nitrogen gas introducing inlet and a distillation outlet. Then, 0.1 part of trimethyl phosphate was added, and the reaction product was further reacted at 290° C. under atmospheric pressure in a nitrogen gas stream for 30 minutes. Then, the reaction temperature was raised to 310° C., and the pressure of the inside of the reactor was gradually reduced to an absolute pressure of about 0.2 mmHg over 15 minutes. The reaction was further carried out for 40 minutes under these pressure. The resulting polymer was transparent in the molten state, and had an intrinsic viscosity of 0.61, a glass transition temperature of 132° C. and a melting point of 280° C.

What is claimed is:

1. A substantially linear aromatic polyester comprising main recurring units of the following formula

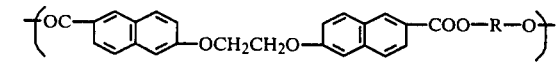

wherein R is an aliphatic group having 2 to 10 carbon atoms.

2. The aromatic polyester of claim 1 wherein the R in the formula is a group of $-CH_2)_n$ in which n is a number of 2 to 10.

3. The armotic polyester of claim 1 wherein the shortest chain portion connecting the two hydroxyl groups of the aliphatic group in the formula is composed of an even number of carbon atoms bonded to each other.

4. The aromatic polyester of claim 1 wherein the R in the formula is a group of $-CH_2)_2$, $-CH_2)_4$

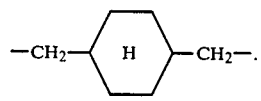

5. A process for producing a substantially linear aromatic polyester which comprises condensing a dicarboxylic acid component composed mainly of 6,6'-(ethylenedioxy)di-2- naphthoic acid or its ester-forming derivative and a glycol component composed mainly of an aliphatic glycol having 2 to 10 carbon atoms in the main chain of the glycol using 1.1 3 moles of the glycol component per mole of the acid component at a temperature between the melting point of the aromatic polyester and 350° C.

6. A process for producing a substantially linear aromatic polyester, which comprises condensing an ethylene glycol diester of 6,6'-(ethylenedioxy)di-2-naphthoic acid, or a mixture of a major proportion of said naphthoate with a dicarboxylic acid, a diol, a hydroxycarboxylic acid or an ester-forming derivative thereof, at a temperature between the melting point of the aromatic polyester and 350° C.

7. The process of claim 5 wherein the esterforming derivative is a lower alkayl ester.

8. A film composed of the aromatic polyester of claim 1.

9. A fiber composed of the aromatic polyester of claim 1.

10. A shaped article composed of the aromatic polyester of claim 1.

11. The aromatic polyester of claim 2 wherein the shortest chain portion connecting the two hydroxyl groups of the aliphatic group in the formula is composed of an even number of carbon atoms bounded to each other.

12. A process according to claim 5 in which the condensation is carried out in the presence of a catalyst.

13. A process according to claim 6 in which the condensation is carried out in the presence of a catalyst.

14. A substantially linear aromatic polyester produced by the process of claim 5.

15. A substantially linear polyester produced by the process of claim 6.

* * * * *